United States Patent
David et al.

[15] 3,661,533
[45] May 9, 1972

[54] ADJUSTABLE APPARATUS FOR FLAME IONIZATION AND FLAME EMISSION DETECTION

[72] Inventors: Donald J. David; David L. Zipps, both of Austin, Tex.

[73] Assignee: Tracor, Inc., Austin, Tex.

[22] Filed: Sept. 22, 1969

[21] Appl. No.: 859,912

[52] U.S. Cl............................23/254 R, 23/232 C, 23/232 E, 23/254 E
[51] Int. Cl. .......................................................G01n 31/12
[58] Field of Search..............23/254 R, 254 E, 232 E, 232 C, 23/255 E, 232

[56] References Cited

UNITED STATES PATENTS 3,086,848    4/1963    Reinecke ............................23/232 C

OTHER PUBLICATIONS

Braman, R. S., Anal. Chem. 38, No. 4, May 1966, pp. 734–742.

*Primary Examiner*—Morris O. Wolk
*Assistant Examiner*—R. M. Reese
*Attorney*—Arnold and Roylance, Tom Arnold, Donald C. Roylance, Walter Kruger, Bill Durkee, Frank S. Vaden, III and John F. Lynch

[57] ABSTRACT

A flame detector for analyzing constituents of a gas sample includes means for selecting the distance between the flame and an ion collector and means for selectively optically shielding the flame from a photometric device for optimizing sensitivity and specificity in flame ionization and flame emission detection.

19 Claims, 7 Drawing Figures

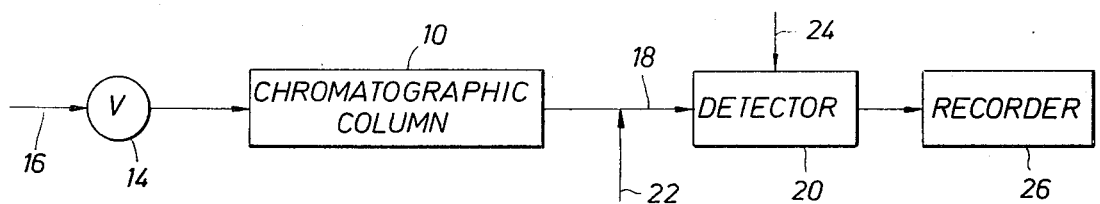
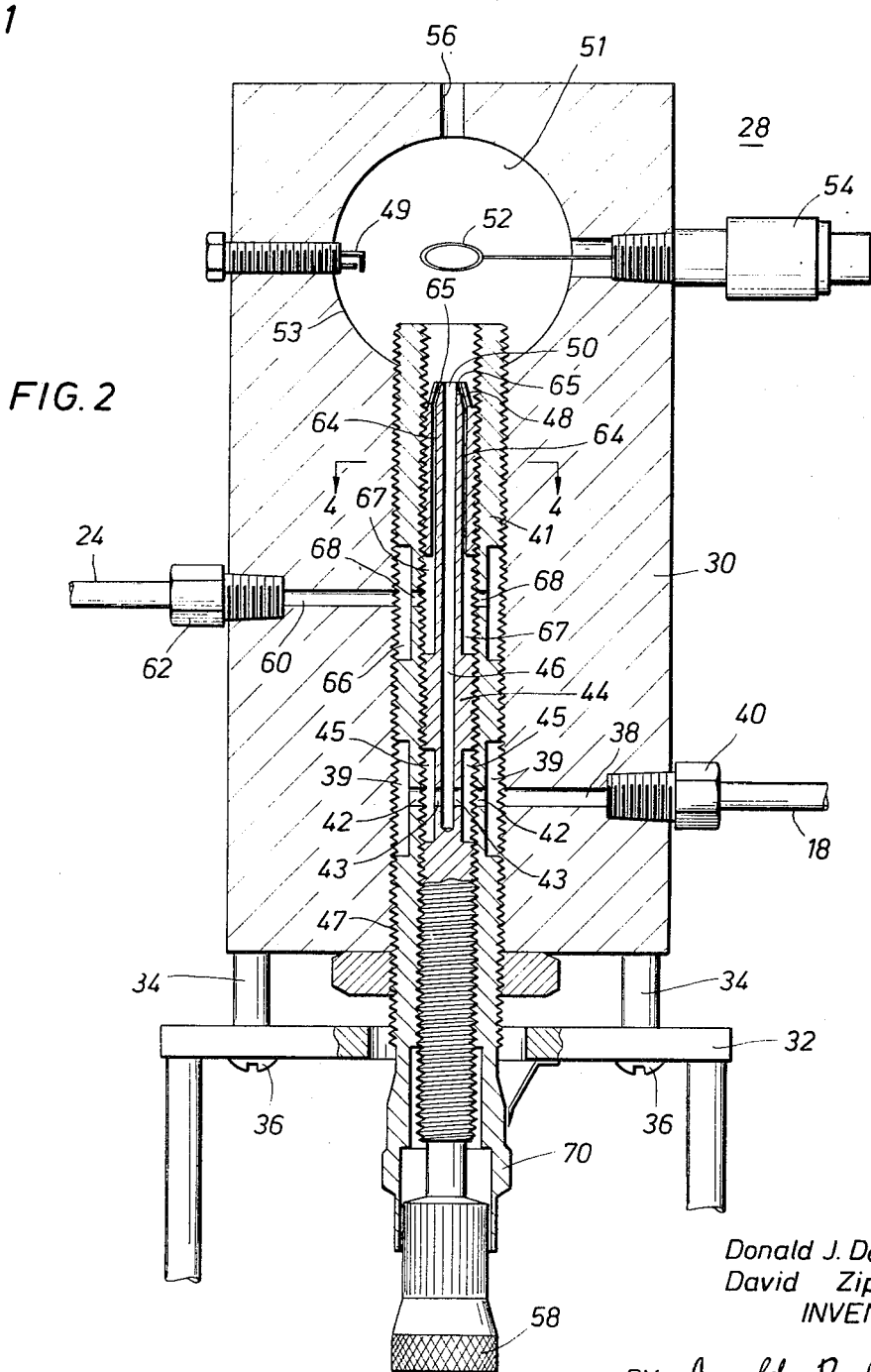

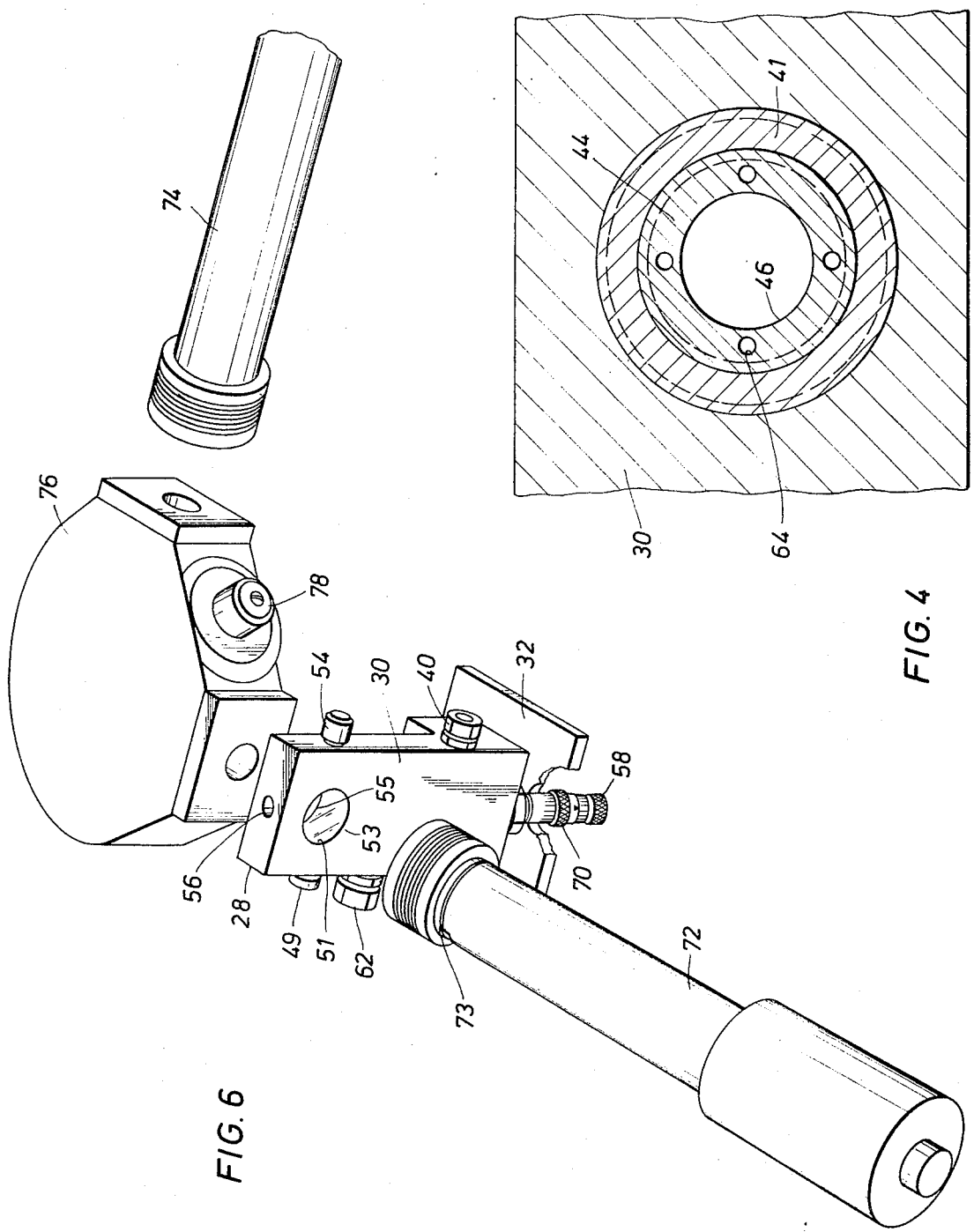

3,661,533

ADJUSTABLE APPARATUS FOR FLAME IONIZATION AND FLAME EMISSION DETECTION

BACKGROUND OF THE INVENTION

The present invention relates to the analysis of gases. More particularly, this invention relates to an improved detector for analyzing gases which contain combustible constituents.

Gas chromatographic detectors are utilized for quantitatively or qualitatively analyzing constituents of a gaseous sample. Detectors are known which measure various physical and chemical properties of elements and compounds, such as thermal conductivity, difference in the speed of sound transmission in a selected medium, electron capture ability, amount of ion current produced upon combustion and observation, and light emission wavelengths and intensity produced by flame excitation.

Combustion or flame detectors are of two basic types, namely, flame ionization detectors and flame emission detectors. A flame ionization detector produces a field of ionized particles of sample by combustion of the sample in a flame. A zone of polarized potential is maintained between the flame and a collector electrode for generating an ion current to be measured. Flame emission detectors utilize a flame to excite the atoms of sample constituents to higher energy states. As the energy states return to previous normal levels, characteristic wavelengths of light are emitted from the sample and measured by photometric or other light analysis methods.

Various apparatus are known for combining flame ionization and flame emission apparatus in a single device. Such dual flame emission-flame ionization detectors are frequently used in gas chromatographic systems in which a sample to be analyzed is introduced into a separation column from which an effluent is eluted as separated components or constituents of the sample in a carrier gas. The effluent is then introduced through a conduit where it is usually mixed with air or oxygen, and possibly other combustible control gases to form a mixture which is ignited at the end of a burner in a combustion chamber. Such control gases may also be introduced into the burner so as to combine with the effluent at the point of combustion to precisely control the reductive, oxidative, and combustible qualities of the flame. For example, metallic elements must be heated to extremely high temperatures for characteristic emissions to occur. An oxygen-rich hydrogen flame is required to generate sufficient heat for emissions from metallic elements. When detecting phosphorus and sulfur compounds, however, such compounds will emit light caused by chemi-luminescence so long as a sufficient ratio of hydrogen is present in the combustible mixture.

Also, the structure of sample constituents in an effluent mixed with $H_2$ and air influence the population of $C_2$ and CH molecules formed. Therefore, the emission intensity of $C_2$ and CH bands are useful in identifying the structure of some compounds. The flame ionization detector section usually consists of an ion collector electrode spaced in the combustion chamber at a fixed distance from the flame. A potential is maintained between the flame and the electrode to attract ionized particles of the various constituents formed by the combustion of gases in the chamber. The flame emission detector section usually consists of a photomultiplier tube optically connected to the flame through an opening in the combustion chamber. An interference filter or adjustable monochromator is placed between the photomultiplier tube and the flame so that only emission of a desired wavelength is measured. Suitable recorders are electrically connected to the ion collector electrode and photomultiplier tube to record the flame emission and ion responses produced by combustion of the gases.

A dual detector is particularly versatile since it combines the unique capabilities of both flame emission and flame ionization in a single device. A flame emission detector is particularly suited for identifying functional groups of compounds, detecting differences in structure of similar compounds, and identifying hetero-atom-containing compounds. Flame emission detection can be used for the study of the structure of organic compounds, as well as component identification because of its dependence on wavelength and its inherent high sensitivity.

On the other hand, certain compounds which are detected poorly or not at all by flame emission detection are well suited for flame ionization detection, such as CO, $CO_2$, $N_2O_4$, $SO_2$, $N_2F_4$, HF and $CS_2$.

Moreover, comparison of the flame emission and flame ionization responses is useful in qualitative analysis. Further, the ratio of such responses (FE/FI ratio) measured at a particular wavelength can be compared with the FE/FI ratio at a different wavelength to identify unknown constituents. Also, comparison of the FE/FI ratio of an unknown compound with that of a known compound at the same wavelength is particularly useful in identifying the structure or functional group of the unknown compound.

It is known that the wavelength of emission from the combusted constituents depends on the emitting atom, molecule, ion, or group of atoms while the recorded output of a flame emission detector is primarily a function of the concentration of the emitting constituents in the combustible effluent. The actual recorded emission response, however, is a function of the emission wavelength, the band pass of the interference filter used, the photomultiplier tube wavelength response and tube voltage, the recorder sensitivity setting and range, the flame size and background, and the portion of the flame observed. Some of the factors that influence ionization response are the number of ions present, flame composition and temperature, electrode spacing, and the voltage impressed across the collector electrode and flame.

In both flame emission and flame ionization, for optimum response, the above-mentioned factors must be selectively controlled and continuously adjustable in order to obtain maximum specificity and sensitivity. Previous gas chromatographic detectors employing the principle of flame ionization are limited in their sensitivity to the ions formed by virtue of the fixed geometry of the collector electrode relative the flame. Further, previous flame emission detectors lack flexibility in selecting only a portion of the flame to be viewed.

The present invention provides apparatus for optimizing sensitivity and specificity in flame emission and flame ionization detection in a single apparatus by providing for precise adjustment of the distance between the flame and the collector electrode. There is further provided apparatus for optimizing sensitivity and specificity in flame emission detection by providing for precise adjustment allowing for observation of a selected portion of the flame in photo emission detection.

SUMMARY OF THE INVENTION

In accordance with a first aspect of the present invention an apparatus is provided for detecting constituents of material to be analyzed in a gaseous sample. The apparatus comprises a detector block, a combustion chamber in the detector block, an ion collector electrode positioned inside the chamber, a flame nozzle for providing a flame produced by the combustion of the gaseous sample introduced through the nozzle into the combustion chamber, and means for positioning the flame nozzle relative the electrode so that the distance between the flame and the electrode is selectable. Such positioning means can include a holding member in the detector block having a threaded inner wall. A threaded flame barrel connected to the flame nozzle is disposed in the threaded wall. By rotating the flame barrel, axial displacement of the nozzle is effected for selectively positioning the flame relative the electrode.

In accordance with a second aspect of the present invention, the apparatus described above also includes a photometric device having a field of view within the combustion chamber through a window in the chamber for forming an optical connection with the flame. Also included is a tubular optical shield coaxial with the flame nozzle selectively positionable relative the flame nozzle for partially shielding the flame from optical connection with the photometric device.

IN THE DRAWINGS

The instant invention will be more explicitly understood with reference to the accompanying drawings which illustrate specific embodiments in accordance with the invention.

FIG. 1 is a schematic diagram of a gas chromatographic system including a novel flame detection apparatus according to an embodiment of this invention.

FIG. 2 is a vertical partial sectional view showing the novel flame detection apparatus of FIG. 1 in greater detail.

FIG. 4 is a sectional view taken along line 4—4 of FIG. 2 showing the disposition of the central and secondary conduits of the inner barrel.

FIG. 6 is a partially exploded perspective view of the novel detection apparatus according to an embodiment of the invention showing the flame emission detection section.

Figure 3:
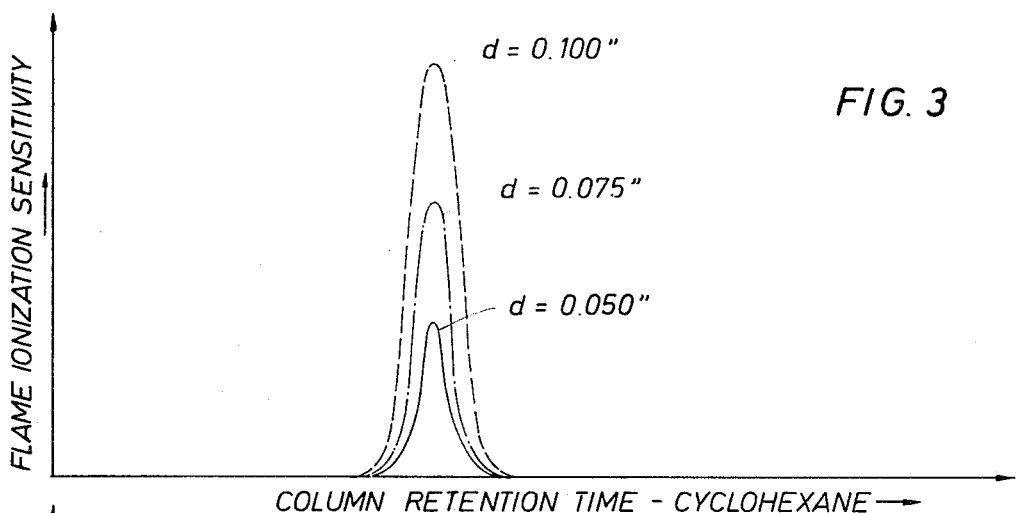
FIG. 3 is a graph of a chromatogram obtained from strip-chart recorder 26 showing increased ionization sensitivity for cylcohexane.

Referring now to FIG. 1 there is shown a conventional chromatographic column 10 of tubular configuration which may be of metal, glass, plastic or other suitable, typically rigid, material. Column 10 contains a solid absorbent or inert support packing material to which a coating liquid has been applied such that the packing material selectively retards passage therethrough of a predetermined volume of sample to be analyzed. The sample which may be in the form of a gas, liquid or even fine solid particles is introduced into column 10 through control valve 14 into conduit 16. The constituents of the sample are then eluted sequentially from column 10 by introducing a carrier gas in the column through conduit 16. A column effluent is eluted as separated sample constituents in a carrier gas. The effluent is carried through conduit 18 to be analyzed by detector 20. Hydrogen, oxygen, air, and possible other combustible gases or any mixture thereof may be introduced into detector 20 through respective conduits 22 and 24 to create a controlled combustible mixture within detector 20, as will be described in detail below. The output of detector 20 is generally a qualitative and quantitative measure of the constituents of the sample introduced into the chromatographic system. A recording of the output responses of detector 20 can be made by a conventional recorder, such as strip chart recorder 26. A recording or chromatogram of these responses typically results in a multipeaked curve. Measured peak heights or areas of each peak of the curve, and selected ratios of such heights or areas are useful in determining the identity and relative concentrations of sample constituents. FIG. 2 shows a detailed partial sectional view of a detector block assembly 28 of detector 20 according to one embodiment of the invention. Conduit 18 secured by retainer 40 is connected to sample inlet port 38 in detector block 30. Detector block 30 is rigidly supported above base 32 by studs 36 and spacers 34.

Sample inlet port 38 is in communication with a central conduit 46 in a flame barrel 44 by means of a cylindrical recess 39 in a shield barrel 41 coaxial with flame barrel 44, and sample apertures 42 and 43 in shield and flame barrels 41 and 44, respectively. The upper end of flame barrel 44 terminates in a flame nozzle 48.

To column effluent passing through sample inlet port 38 and central conduit 46 extends through flame nozzle 48 terminating in a central orifice 50. A flame igniter 49 initiates combustion of the gaseous sample in a combustion chamber 51 producing a controllable flame (not shown) at central orifice 50. The combusted gases and residue are evacuated from chamber 51 through exhaust 56.

A zone of polarized potential is maintained between the flame and an ion collector electrode ring 52 positioned in combustion chamber 51 by an electrometer input connector plug 54. Ionized particles of the various constituents formed by their combustion in chamber 51 form an ion current and are attracted to ion collector electrode 52. A suitable recorder, such as strip chart recorder 26 shown in FIG. 1, is connected to input plug 54 in order to record the intensity of ion current, as well as the retention time and sequence of occurrence of the constituents of the sample eluting from column 10.

In order to insure accurate and precise measurements in flame ionization detection, the factors discussed above which effect sensitivity and specificity must be selectively controllable.

Various elements, compounds, and mixtures thereof respond differently when subjected to combustion and ionization. It is important, therefore, to maintain a distance between the flame and ion collector electrode 52 such as will optimize the sensitivity of ion current measurements taken for a particular sample or sample constituent. Thus, it becomes necessary to adjust the flame-to-ion electrode distance accurately and precisely.

Accordingly, means is provided for selectively positioning flame nozzle 48 relative to electrode 52 in order to move the flame relative to electrode 52. Such positioning means includes a holding member, such as shield barrel 41 having a threaded inner wall. Flame barrel 44 is threaded to cooperate with the threaded inner wall of shield barrel 41 so as to translate rotation of flame barrel 44 to axial displacement of barrel 44 and nozzle 48.

A first precision micrometer 58 is connected to flame barrel 44 for raising and lowering flame barrel 44 in shield barrel 41 and for precisely measuring the axial displacement of flame barrel 44 and flame nozzle 48 relative to shield barrel 41. The pitch of the threads of flame barrel 44 and the inner wall of barrel 41 are such that a precise adjustment is easily made. For example, in the embodiment shown, one rotation of inner barrel 44 results in a vertical displacement of 0.025 inch. Thus, since the flame nozzle is selectively positionable by means of micrometer 58, the flame produced in chamber 51 is selectively positionable relative ion collector electrode 52.

FIG. 3 is a graph of chromatograms produced by strip-chart recorder 26 (FIG. 1). The graph illustrates an example of increasing ionization responses by optimizing flame-to-electrode distance. Equal volumes of cyclohexane were selected for three sample runs; the resulting chromatograms are shown superimposed. The solid-lined peak represents an ionization response for cyclohexane with the flame-to-electrode distance, $d$, equal to 0.050 inch. The dotted-line peak was recorded for $d = 0.075$ inch, and the dashed lined peak for $d = 0.100$ inch.

Optimization of sensitivity and specificity in detection is further increased by selectively controlling flame size and composition. Selected amounts or ratios of air, oxygen, hydrogen, or other gases can be introduced into the column effluent before the sample reaches detector 20 to provide an oxidative or reductive flame and to control the combustibility of the effluent. FIG. 1 shows such gases being introduced into the effluent through conduit 22. Precise flame size and composition is attainable by introducing a sheathing wall of control gases, such as air, oxygen, or hydrogen around the flame at the point of combustion in the chamber.

The inlet ports for sample gas and control gas communicate respectively with the central conduit 46 and the secondary conduit 64 by means of apertures and recesses in the flame barrel and the shield barrel which maintain the flow path regardless of the positioning of the flame barrel and the shield barrel.

First apertures 43 in the wall of first recess 45 in flame barrel 44 establish communication between central conduit 46 and first recess 45. Second apertures 42 are disposed in the wall of shield barrel 41 and maintain communication with first recess 45. Similarly, second apertures 42 exist within second recess 39 in the wall of the shield barrel 41. Sample gas inlet port 38 communicates directly with second recess 39 in the shield barrel 41 and thereby communication is established. The height of second recess 39 is such that sample gas inlet port 38 remains in communication with recess 39 during axial displacement of shield barrel 41. Similarly, the height of first recess 45 is such that aperture 42 remains in communication with recess 45 during axial displacement of flame barrel 44.

The flow of control gases to secondary conduit 64 is similarly established. Secondary conduits 64 terminate in third recess 67 in flame barrel 44. Third aperture 68 in the wall of shield barrel 41 communicates with third recess 67 in the flame barrel and also with fourth recess 66 in the shield barrel. In turn, fourth recess 66 communicates with control gas inlet port 60. The height of recess 66 is such that control gas inlet port 60 remains in communication with recess 66 during axial displacement of shield barrel 41. Similarly, the height of recess 67 is such that third aperture 68 remains in communication with recess 67 during axial displacement of flame barrel 44.

FIG. 4 shows a cross section of the barrels and detector block along section line 4—4 of FIG. 2, revealing the relative location and spacing of central conduit 46 and secondary conduits 64 in flame barrel 44. Selected amounts of control gases are introduced into secondary conduits 64 which terminate in secondary orifices 65 in flame nozzle 48. The emerging control gases form a sheath around the flame, thereby affecting flame composition and flame size. The number of secondary conduits 64 and the spacing of secondary orifices 65 relative to central orifice 50 can vary depending on the application. Indeed, in other embodiments, flame nozzle 48 may be interchangeable with other flame nozzles having different configurations best suited for the particular application.

The detector of the present invention can also be used for dual flame ionization-flame emission detection. FIG. 6 shows a partially exploded perspective view of a flame emission detector according to one embodiment of the invention utilizing detector block assembly 28, first and second photomultiplier tubes 72 and 74, an adjustable monochromator 76, and an interference filter 73.

Outer surfaces of detector block 30 have openings or windows 53 and 55 which define the respective ends of cylindrical combustion chamber 51 in block 30. Photomultiplier tube 72 has a field of view within combustion chamber 51 through an interchangeable fixed wavelength interference filter 73 and window 53 for forming a filtered optical connection with the flame. Often it is desirable to view the emissions of a flame at two or more wavelengths simultaneously as well as perform simultaneous flame ionization and flame emission detection. Accordingly, photomultiplier tube 74 has a field of view within combustion chamber 51 through adjustable monochromator 76 and window 55 opposite window 53 for forming a selectively filtered optical connection with the flame and tube 74. The wavelength of interest to be viewed by tube 74 is selected by wavelength adjuster 78.

As previously discussed, sensitivity and specificity in flame emission detection is dependent on the portion of the flame viewed, varying the optical connection between the flame and the photomultiplier tube 72 is accomplished by raising or lowering flame barrel 44, as described above. Also, flame barrel 44 (FIG. 2) is retractable in shield barrel 41 to remove flame nozzle 48 from the field of view of photomultiplier tube 72, thereby partially shielding the flame from optical connection with photomultiplier tube 72.

Furthermore, shield barrel 41 forms an optical shield around the flame and is selectively positionable relative flame nozzle 48 for partially shielding the flame from the optical connection with photomultiplier tube 72. Shield barrel 41 is threaded to cooperate with a threaded bore 47 in detector block 30 so as to translate rotation of shield barrel 41 to axial displacement.

A second precision micrometer 70 is connected to shield barrel 41 for raising and lowering barrel 41 and for precisely measuring the axial displacement of barrel 41 relative to flame nozzle 48. Thus, only a selected portion of barrel 41 extends into chamber 51 forming a shield around the flame. By selectively positioning shield barrel 41 relative to flame nozzle 48 in chamber 51, a selected portion of the flame is exposed unshielded in the chamber. The pitch of the threads of the outer surface of shield barrel 41 and bore 47 in detector block 30 are such that a precise and accurate vertical adjustment can be made by turning second precision micrometer 70.

Figure 5:
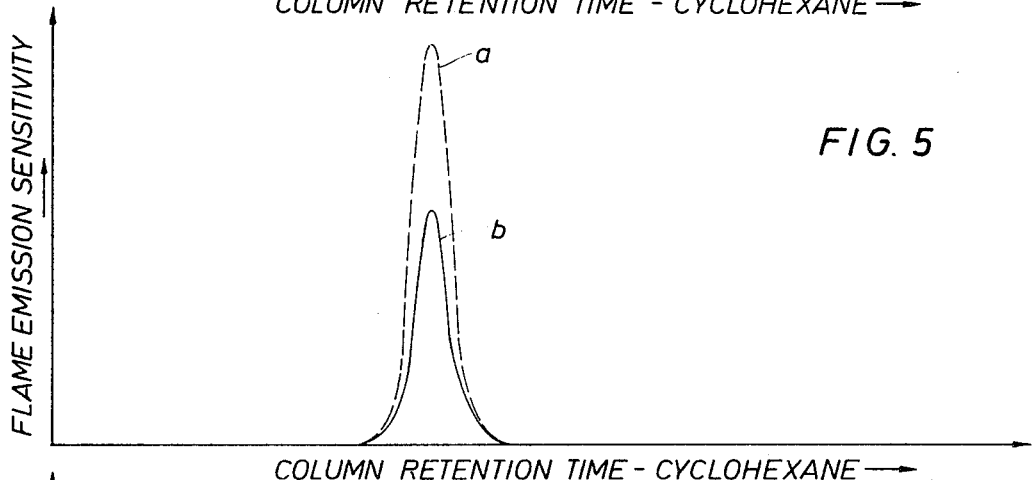
FIG. 5 is a graph of two chromatograms showing increased flame emission response for cyclohexane.

FIG. 5 shows a graph of two chromatograms obtained by flame emission responses for cyclohexane. The dotted-lined peak represents an emission response recorded for shield barrel 41 in position $a$, while the solid-lined response was recorded for shield barrel 41 in position $b$.

There are several advantages of using two photometric devices simultaneously such as described above. First, the ratio of responses obtained simultaneously at different wavelengths is useful for qualitative identification. For example, benzene is easily identified by comparing emission responses at 5,160 angstroms wavelength with responses at 4,315 angstroms. Also, relative responses of two emissions in the same sample may provide more certainty in identification than can be derived by comparing retention times only from two samples, especially when comparing various compounds which differ only in location or character of the bonding of one or more of its elements. Further, utilizing two photometric devices eliminates the need to conduct separate "runs," and thus eliminates any error caused by qualitative or quantitative differences between the samples for each run.

Flexibility is also achieved by the present invention in that a fixed interference filter or adjustable monochromator may be used. Interference filters are suitable for viewing organic compounds since the band pass of the interference filter is usually equal to or narrower than the sample emission band-width. On the other hand, some inorganic compounds are better suited for emission detection utilizing a monochromator since interference filters pass bands of light much wider than that of monochromators. For example, emission lines of metallic elements are much narrower than the bandwidth of interference filters, and reliable detection requires using a highly specific monochromator.

Figure 7:
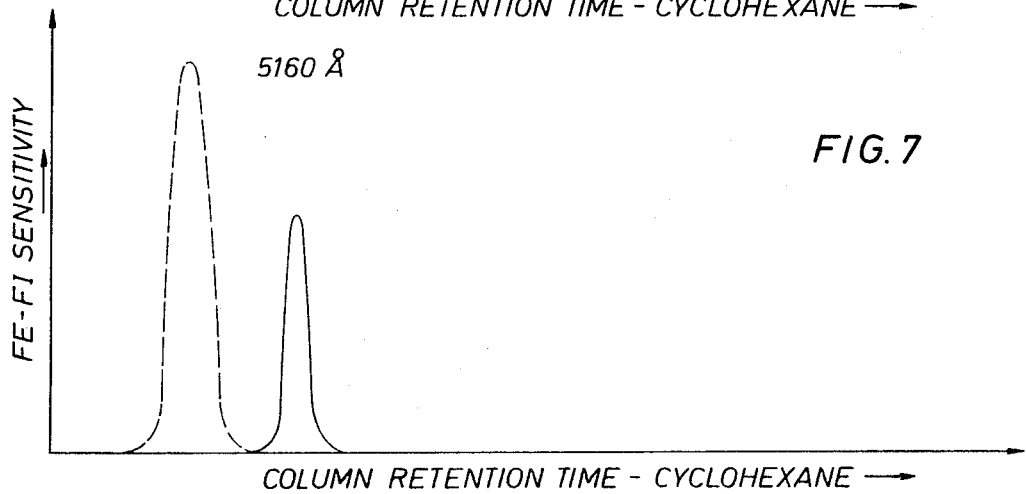
FIG. 7 is a graph of chromatograms for simultaneous flame ionization responses for cyclohexane.

FIG. 7 is a graph of superimposed flame ionization and flame emission chromatogram responses for cyclohexane. The solid-lined peak is the ionization response trace, while the dotted-lined peak is the emission response trace recorded using a 5,160 angstrom interference filter. As explained above, FE/FI ratios are useful in identifying unknown compounds and predicting structural differences between similar compounds.

While the invention has been described with reference to particular embodiments, it is understood that their description is not meant to be construed in a limiting sense. Various modifications of the disclosed embodiments as well as other embodiments of the invention may be apparent to persons skilled in the art upon reference to this description. For example, while two photomultiplier tubes are shown, the invention admits to flame emission detection using a single photomultiplier tube. Further, a fixed interference filter can be used exclusively instead of an adjustable monochromator. Also, while the invention is suitable for simultaneous dual flame ionization-emission detection, it admits equally to use as a single flame ionization detector or a single flame emission detector.

What is claimed is:

1. Apparatus for detecting constituents in a gaseous sample comprising:
   a detector block;
   a combustion chamber in said detector block;
   an ion collector electrode positioned within said chamber;
   a flame nozzle for providing a flame produced by the combustion of said sample introduced through said nozzle; and means for selectively positioning said flame nozzle relative said electrode for moving said flame relative said electrode.

2. Apparatus according to claim 1 wherein said means includes:
a holding member in said detector block having a threaded inner wall and a threaded flame barrel connected to said flame nozzle disposed in said inner wall of said holding member;
said threaded flame barrel cooperating with said threaded inner wall of said holding member to translate rotation of said flame barrel to axial displacement of said flame barrel and said flame nozzle for selectively positioning said flame relative said ion collector electrode.

3. Apparatus according to claim 2 including, means for precisely measuring displacement of said flame barrel and said flame nozzle relative said holding member.

4. Apparatus according to claim 2 wherein said barrel includes:
a central conduit terminating in a central orifice in said flame nozzle for introducing said sample into said combustion chamber; and
a plurality of secondary conduits terminating in secondary orifices in said flame nozzle spaced about said central orifice for introducing selected amounts of control gases into said combustion chamber to sheath said flame.

5. Apparatus for detecting constituents in a gaseous sample comprising:
a detector block;
a combustion chamber in said detector block having a window;
a flame nozzle for providing a flame produced by the combustion of said sample introduced through said nozzle; a photometric device having a field of view within said combustion chamber through said window for forming an optical connection with said flame; and
means for selectively varying the relative position of said flame nozzle with respect to said field of view for varying said optical connection between said flame and said photometric device.

6. Apparatus according to claim 5 wherein said photometric device includes:
a photomultiplier tube and an interchangeable fixed wavelength interference filter;
said photomultiplier tube having a field of view within said combustion chamber through said filter for forming a filtered optical connection with said flame.

7. Apparatus according to claim 5 wherein said photometric device includes:
a photomultiplier tube, and
an adjustable monochromator for selecting the wave length of light passable through said monochromator,
said photomultiplier tube having a field of view within said combustion chamber through said adjustable monochromator for forming a selectively filtered optical connection with said flame.

8. Apparatus according to claim 5 wherein, said combustion chamber has a first and second window,
said photometric device includes:
a first and second photomultiplier tube;
an interchangeable fixed wavelength interference filter; and
an adjustable monochromator for selecting a wavelength of light to be viewed,
said first photomultiplier tube having a field of view through said first window through said adjustable monochromator for forming a selectively filtered first optical connection with said flame, said second photomultiplier tube having a field of view through said second window through said filter for forming a filtered second optical connection with said flame.

9. Apparatus according to claim 5 wherein said means includes:
a holding member in said detector block having a threaded inner wall, and
a threaded flame barrel connected to said flame nozzle disposed in said inner wall of said holding member;
said threaded flame barrel cooperating with said threaded inner wall of said holding member to translate rotation said flame barrel to axial displacement of said flame barrel and said flame nozzle for selectively varying said optical connection with said photometric device.

10. Apparatus according to claim 9 wherein said flame barrel is axially retractable in said holding member to remove said flame nozzle from said field of view for partially shielding said flame from said optical connection with said photometric device.

11. Apparatus according to claim 9 including:
first precision micrometer means connected to said flame barrel for measuring displacement of said flame barrel and said flame nozzle relative said holding member.

12. Apparatus according to claim 5 including:
an optical shield selectively positionable relative said flame nozzle for partially shielding said flame from said optical connection with said photometric device.

13. Apparatus according to claim 12 wherein said optical shield comprises:
a threaded shield barrel coaxial with said flame barrel disposed in a threaded bore in said detector block;
said threaded shield barrel cooperating with said threaded bore in said detector block to translate rotation of said shield barrel to axial displacement, said shield barrel being selectively positionable relative said flame nozzle for partially shielding said flame from said optical connection with said photometric device.

14. Apparatus according to claim 13 including,
second precision micrometer means connected to said shield barrel for measuring axial displacement of said shield barrel relative said flame nozzle.

15. Apparatus according to claim 13 wherein said flame barrel includes:
a central conduit terminating in a central orifice in said flame nozzle for introducing said sample into said combustion chamber; and
a plurality of secondary conduits terminating in secondary orifices in said flame nozzle spaced about said central orifice for introducing selected amounts of control gases into said combustion chamber to sheath said flame.

16. Apparatus according to claim 15 including,
means to supply said sample to said central conduit comprising:
a first cylindrical recess in said flame barrel having a first aperture in the wall of said first recess communicating with said central conduit;
a second cylindrical recess in said shield barrel having a second aperture in the wall of said second recess communicating with said first recess;
a sample inlet port in said detector block communicating with said second cylindrical recess;
the height of said first recess being such that said second aperture remains in communication with said recess during axial displacement of said flame barrel, the height of said second recess being such that said sample inlet port remains in communication with said second recess during axial displacement of said shield barrel.

17. Apparatus according to claim 16 including,
means to supply control gases to said secondary conduits comprising:
a third cylindrical recess in said flame barrel communicating with said secondary conduits;
a fourth cylindrical recess in said shield barrel having a third aperture in the wall of said fourth recess communicating with said third recess; and
a control gas inlet port in said detector block communicating with said fourth recess;

the height of said third cylindrical recess being such that said third aperture remains in communication with said third recess during axial displacement of said flame barrel, the height of said fourth recess being such that said control gas inlet port remains in communication with said fourth recess during axial displacement of said shield barrel.

18. Apparatus for detecting constituents in a gaseous sample comprising:
a detector block;
a combustion chamber in said detector block having a window;
an ion collector electrode positioned within said combustion chamber;
a flame nozzle for providing a flame produced by the combustion of said sample introduced through said nozzle;
a photometric device having a field of view within said combustion chamber through said window for forming an optical connection with said flame;
means for selectively positioning said flame nozzle for moving said flame relative said electrode and for varying said optical connection between said flame and said photometric device; and
an optical shield selectively positionable relative said flame nozzle for partially shielding said flame from said optical connection with said photometric device.

19. A gas chromatographic system comprising:
a column for eluting a gaseous sample;
means for detecting constituents in said sample, said means including:
a detector block;
a combustion chamber in said detector block having a window;
an ion collector electrode positioned within said combustion chamber;
a flame nozzle for providing a flame produced by the combustion of said sample introduced through said nozzle;
a photometric device having a field of view within said combustion chamber through said window for forming an optical connection with said flame;
means for selectively positioning said flame nozzle for moving said flame relative said electrode and for varying said optical connection between said flame and said photometric device;
an optical shield selectively positionable relative said flame nozzle for partially shielding said flame from said optical connection with said photometric device;
means to measure the retention time of said constituents of said sample in said column;
means connected to said ion collector electrode to measure the intensity of ion current from said flame; and
means connected to said light sensitive element to measure at selected wavelengths the intensity of light emission from said flame.

* * * * *